United States Patent
Kim

(10) Patent No.: US 12,039,178 B2
(45) Date of Patent: Jul. 16, 2024

(54) APPARATUS WITH MEMORY BLOCK MANAGEMENT AND METHODS FOR OPERATING THE SAME

(71) Applicant: Micron Technology, Inc., Boise, ID (US)

(72) Inventor: Kyungjin Kim, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 71 days.

(21) Appl. No.: 17/865,245

(22) Filed: Jul. 14, 2022

(65) Prior Publication Data
US 2024/0020037 A1 Jan. 18, 2024

(51) Int. Cl.
G06F 12/00 (2006.01)
G06F 3/06 (2006.01)
G06F 13/00 (2006.01)

(52) U.S. Cl.
CPC .......... *G06F 3/064* (2013.01); *G06F 3/0619* (2013.01); *G06F 3/0659* (2013.01); *G06F 3/0679* (2013.01)

(58) Field of Classification Search
CPC ...... G06F 3/064; G06F 3/0619; G06F 3/0659; G06F 3/0679
USPC .......................................................... 711/154
See application file for complete search history.

(56) References Cited

U.S. PATENT DOCUMENTS

| | | | | |
|---|---|---|---|---|
| 8,238,157 B1* | 8/2012 | Sommer | ............... | G11C 29/78 |
| | | | | 365/185.18 |
| 8,902,647 B1* | 12/2014 | Raghu | ................... | G11C 16/22 |
| | | | | 365/185.11 |
| 9,460,799 B1* | 10/2016 | Costa | .................... | G11C 29/52 |
| 9,478,299 B2* | 10/2016 | Kim | ...................... | G11C 16/26 |
| 9,563,504 B2* | 2/2017 | Liang | .................... | G11C 16/26 |
| 9,564,233 B1* | 2/2017 | Cho | ................... | G11C 11/5628 |
| 9,978,456 B2* | 5/2018 | Khandelwal | .......... | G11C 16/26 |
| 11,386,969 B1* | 7/2022 | Banerjee | ............... | G11C 29/52 |
| 11,513,682 B2* | 11/2022 | Yano | .................... | G06F 3/0679 |
| 2015/0036431 A1* | 2/2015 | Park | ................... | G11C 16/3427 |
| | | | | 365/185.12 |
| 2015/0103599 A1* | 4/2015 | Kim | ................... | G11C 11/5628 |
| | | | | 365/185.12 |
| 2016/0141046 A1* | 5/2016 | Khandelwal | ........ | G11C 11/5628 |
| | | | | 365/185.02 |
| 2016/0172045 A1* | 6/2016 | Shukla | ............... | G11C 16/0483 |
| | | | | 365/185.11 |
| 2016/0240262 A1* | 8/2016 | Shah | ...................... | G11C 16/34 |
| 2016/0343449 A1* | 11/2016 | Lee | ......................... | G11C 16/14 |
| 2017/0075580 A1* | 3/2017 | Nagata | ................ | G06F 12/0246 |
| 2017/0330631 A1* | 11/2017 | Diep | .................. | G11C 16/3431 |
| 2018/0122489 A1* | 5/2018 | Ray | ..................... | G11C 16/3495 |
| 2019/0034290 A1* | 1/2019 | Guo | .................... | G06F 11/1072 |
| 2019/0156904 A1* | 5/2019 | Hong | ................... | G11C 16/10 |
| 2019/0164612 A1* | 5/2019 | Solanki | .............. | G11C 16/0483 |

(Continued)

*Primary Examiner* — Sheng Jen Tsai
(74) *Attorney, Agent, or Firm* — Perkins Coie LLP

(57) ABSTRACT

Disclosed herein are methods, apparatuses and systems related to manage memory blocks. A memory system can track a duration while a memory block remains open for programming operations. When the tracked duration meets or exceeds a corresponding threshold, the memory system can implement an internally commanded programming operation to store predetermined data into an open location that is adjacent to an end of the previously-written data in the memory block.

20 Claims, 4 Drawing Sheets

(56) References Cited

U.S. PATENT DOCUMENTS

| | | | |
|---|---|---|---|
| 2019/0227926 A1* | 7/2019 | Ke | G06F 12/0253 |
| 2019/0304550 A1* | 10/2019 | Shen | G11C 16/3418 |
| 2020/0210331 A1* | 7/2020 | Muchherla | G06F 3/064 |
| 2020/0310688 A1* | 10/2020 | Byun | G11C 16/26 |
| 2021/0090657 A1* | 3/2021 | Ahn | G11C 16/32 |
| 2022/0083221 A1* | 3/2022 | Agarwal | G06F 12/0246 |
| 2022/0291837 A1* | 9/2022 | Shao | G06F 3/064 |
| 2022/0301645 A1* | 9/2022 | Banerjee | G11C 16/08 |
| 2022/0365688 A1* | 11/2022 | Perry | G06F 3/0683 |
| 2023/0126422 A1* | 4/2023 | Agrawal | G11C 16/08 |
| | | | 365/233.1 |

\* cited by examiner

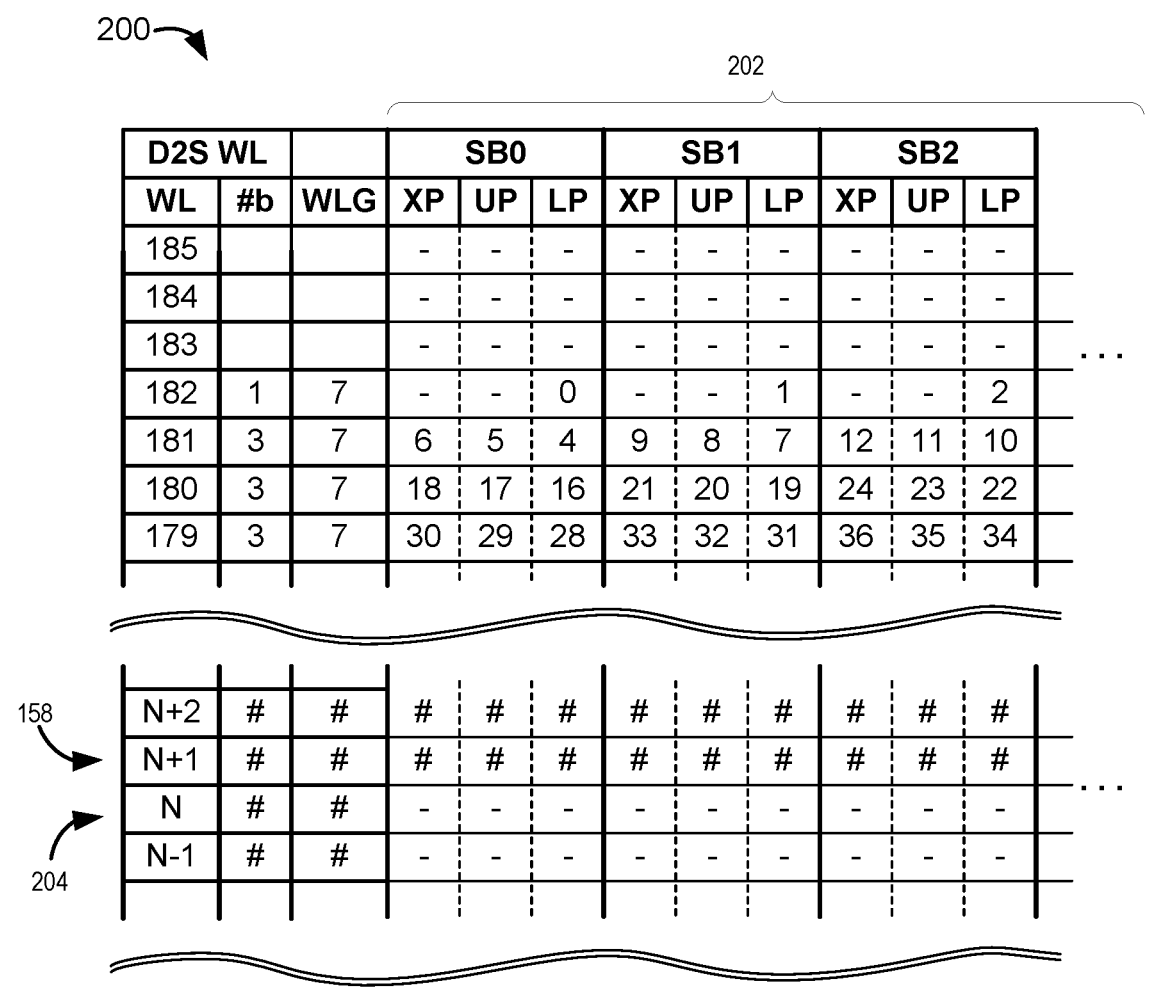

200 ⤳

202

| D2S WL | | | SB0 | | | SB1 | | | SB2 | | |
|---|---|---|---|---|---|---|---|---|---|---|---|
| WL | #b | WLG | XP | UP | LP | XP | UP | LP | XP | UP | LP |
| 185 | | | - | - | - | - | - | - | - | - | - |
| 184 | | | - | - | - | - | - | - | - | - | - |
| 183 | | | - | - | - | - | - | - | - | - | - |
| 182 | 1 | 7 | - | - | 0 | - | - | 1 | - | - | 2 |
| 181 | 3 | 7 | 6 | 5 | 4 | 9 | 8 | 7 | 12 | 11 | 10 |
| 180 | 3 | 7 | 18 | 17 | 16 | 21 | 20 | 19 | 24 | 23 | 22 |
| 179 | 3 | 7 | 30 | 29 | 28 | 33 | 32 | 31 | 36 | 35 | 34 |

158 →
204 →

| N+2 | # | # | # | # | # | # | # | # | # | # | # |
|---|---|---|---|---|---|---|---|---|---|---|---|
| N+1 | # | # | # | # | # | # | # | # | # | # | # |
| N | # | # | - | - | - | - | - | - | - | - | - |
| N-1 | # | # | - | - | - | - | - | - | - | - | - |

*FIG. 2*

APPARATUS WITH MEMORY BLOCK MANAGEMENT AND METHODS FOR OPERATING THE SAME

TECHNICAL FIELD

The disclosed embodiments relate to devices, and, in particular, to semiconductor memory devices with memory block management and methods for operating the same.

BACKGROUND

Memory systems can employ memory devices to store and access information. The memory devices can include volatile memory devices, non-volatile memory devices (e.g., flash memory employing "NAND" technology or logic gates, "NOR" technology or logic gates, or a combination thereof), or a combination device. The memory devices utilize electrical energy, along with corresponding threshold levels or processing/reading voltage levels, to store and access data. However, the performance or characteristics of the memory devices change or degrade over time, usage, or environmental conditions. Similarly, the memory devices may have attributes that inadvertently corrupt data when the data is stored/maintained under some conditions for a relatively long time. Such degradations and data corruptions lead to increased errors in the stored data, thereby reducing the reliability of the memory devices.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 2 illustrates a partially filled block in accordance with an embodiment of the present technology.

DETAILED DESCRIPTION

Figure 1A:
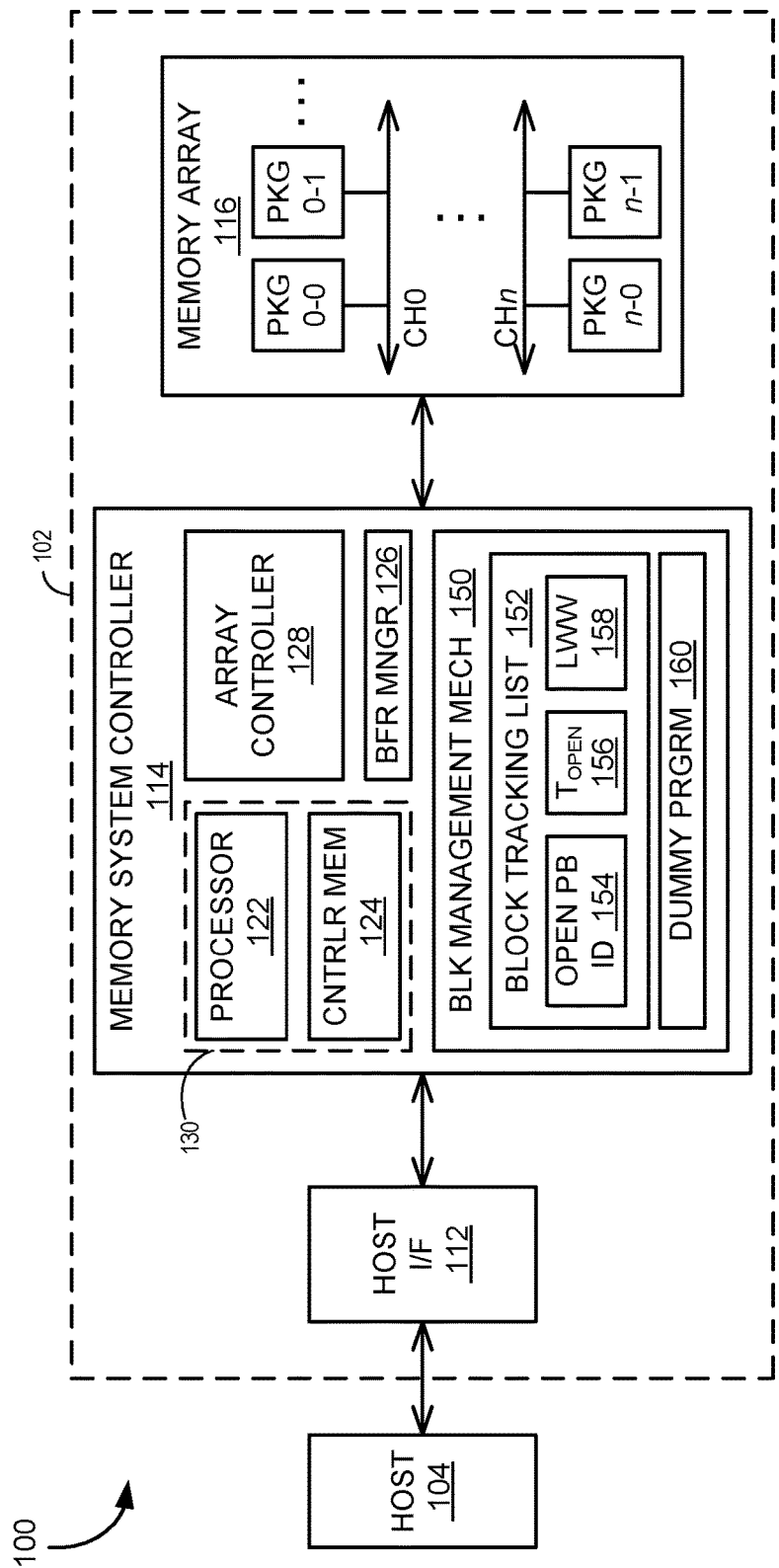
FIG. 1A is a block diagram of a computing system in accordance with an embodiment of the present technology.

As described in greater detail below, the technology disclosed herein relates to an apparatus, such as a memory system, a system with memory device(s), a related method, etc., for managing memory blocks. For example, the apparatus can include a management mechanism configured to control a status (e.g., open or close) of a memory block and/or a block stripe. The management mechanism can track a duration from an open operation for a memory block. When the tracked time exceeds an open duration threshold without completely filling the block or at least beyond a storage minimum, the management mechanism can perform a dummy programming operation (e.g., using predetermined data) and close the open block/stripe.

By performing the dummy programming operation for partially written blocks (PBs), the management mechanism can reduce or prevent charge loss associated with such blocks. For example, the error management and refresh mechanisms of the apparatus move the PBs higher bins (e.g., categorizations reflective of greater charge loss) earlier than other fully written blocks. The charge loss, and the corresponding potential for errors, may be associated with the last-written valid data. In other words, the last-written word line may lose the most charges within the PB. As such, by programming an additional/last word line (WL) with predetermined or dummy values (via, e.g., a dummy programming operation), the block management mechanism can effectively create a buffer/barrier that preserves the integrity of the valid data.

Example Environment

FIG. 1 is a block diagram of a computing system 100 in accordance with an embodiment of the present technology. The computing system 100 can include a personal computing device/system, an enterprise system, a mobile device, a server system, a database system, a distributed computing system, or the like. The computing system 100 can include a memory system 102 coupled to a host device 104. The host device 104 can include one or more processors that can write data to and/or read data from the memory system 102. For example, the host device 104 can include an upstream central processing unit (CPU).

The memory system 102 can include circuitry configured to store data (via, e.g., write operations) and provide access to stored data (via, e.g., read operations). For example, the memory system 102 can include a persistent or non-volatile data storage system, such as a NAND-based Flash drive system, a SSD system, a SD card, or the like. In some embodiments, the memory system 102 can include a host interface 112 (e.g., buffers, transmitters, receivers, and/or the like) configured to facilitate communications with the host device 104. For example, the host interface 112 can be configured to support one or more host interconnect schemes, such as Universal Serial Bus (USB), Peripheral Component Interconnect (PCI), Serial AT Attachment (SATA), or the like. The host interface 112 can receive commands, addresses, data (e.g., write data), and/or other information from the host device 104. The host interface 112 can also send data (e.g., read data) and/or other information to the host device 104.

The memory system 102 can further include a memory system controller 114 and a memory array 116. The memory array 116 can include memory cells that are configured to store a unit of information. The memory system controller 114 can be configured to control the overall operation of the memory system 102, including the operations of the memory array 116.

In some embodiments, the memory array 116 can include a set of NAND Flash devices or packages. Each of the packages can include a set of memory cells that each store data in a charge storage structure. The memory cells can include, for example, floating gate, charge trap, phase change, ferroelectric, magnetoresitive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state. The stored charge on the charge storage structure of the memory cell can indicate the Vt of the cell. For example, a single level cell (SLC) can be programmed to a targeted one of two different data states, which can be represented by the binary units 1 or 0. Also, some flash memory cells can be programmed to a targeted one of more than two data states. Multilevel cells (MLCs) may be programmed to any one of four data states (e.g., represented by the binary 00, 01, 10, 11) to store two bits of data. Similarly, triple level cells (TLCs) may be programmed to one of eight (i.e., $2^3$) data states to store three bits of data, and quad level cells (QLCs) may be programmed to one of 16 (i.e., $2^4$) data states to store four bits of data.

Such memory cells may be arranged in rows (e.g., each corresponding to a word line) and columns (e.g., each corresponding to a bit line). The arrangements can further correspond to different groupings for the memory cells. For example, each word line can correspond to one or more memory pages. Also, the memory array 116 can include memory blocks that each include a set of memory pages. In operation, the data can be written or otherwise programmed (e.g., erased) with regards to the various memory regions of the memory array 116, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

While the memory array 116 is described with respect to the memory cells, it is understood that the memory array 116 can include other components (not shown). For example, the memory array 116 can also include other circuit components, such as multiplexers, decoders, buffers, read/write drivers, address registers, data out/data in registers, etc., for accessing and/or programming (e.g., writing) the data and for other functionalities.

As described above, the memory system controller 114 can be configured to control the operations of the memory array 116. The memory system controller 114 can include a processor 122, such as a microcontroller, special purpose logic circuitry (e.g., a field programmable gate array (FPGA), an application specific integrated circuit (ASIC), etc.), or other suitable processor. The processor 122 can execute instructions encoded in hardware, firmware, and/or software (e.g., instructions stored in controller embedded memory 124 to execute various processes, logic flows, and routines for controlling operation of the memory system 102 and/or the memory array 116.

In some embodiments, the memory system controller 114 can include a buffer manager 126 configured to control and/or oversee information exchanged with the host device 104. The buffer manager 126 can interact with the host interface 112 regarding operations of receiving and/or transmitting buffers therein.

Further, the memory system controller 114 can further include an array controller 128 that controls or oversees detailed or targeted aspects of operating the memory array 116. For example, the array controller 128 can provide a communication interface between the processor 122 and the memory array 116 (e.g., the components therein). The array controller 128 can function as a multiplexer/demultiplexer, such as for handling transport of data along serial connection to flash devices in the memory array 116.

In controlling the operations of the memory system 102, the memory system controller 114 (via, e.g., the processor 122 and the embedded memory 124) can implement a Flash Translation Layer (FTL) 130. The FTL 130 can include a set of functions or operations that provide translations for the memory array 116 (e.g., the Flash devices therein). For example, the FTL 130 can include the logical-physical address translation, such as by providing the mapping between virtual or logical addresses used by the operating system to the corresponding physical addresses that identify the Flash device and the location therein (e.g., the layer, the page, the block, the row, the column, etc.). Also, the FTL 130 can include a garbage collection function that extracts useful data from partially filed units (e.g., memory blocks) and combines them to a smaller set of memory units. The FTL 130 can include other functions, such as wear-leveling, bad block management, concurrency (e.g., handling concurrent events), page allocation, error correction code (e.g., error recovery), or the like.

A large part of the controlled operations for the memory system 102 may be unpredictable as they occur in response to commands from the host 104. Because the data transport (e.g., programming operations) can occur at unpredictable times, the memory system 102 may inadvertently suspend memory locations under certain conditions for prolonged periods of time. For example, since the memory system 102 is unaware when the host 104 will begin, continue, and/or end a write operation (e.g., for a stream of related data), the memory system 102 may be configured to leave a partially filled memory block or a PB (e.g., as defined by a predetermined storage threshold) open for further writes. By leaving the PB open, the memory system 102 can store more data into each memory block and increase the storage efficiency/density. However, when partially filled memory blocks remain open, the content already stored therein can be more susceptible to data corruption (via, e.g., increased charge loss) than closed or filled blocks. In comparison to blocks storing larger amounts of content, the content in partially filled memory blocks may be more susceptible to corruption even after the blocks are closed. In other words, the partially filled blocks may experience increased amounts of charge loss in comparison to blocks having data exceeding the storage threshold.

The memory system 102 can include a memory management mechanism (e.g., circuitry, software instructions, firmware, or a combination thereof) that addresses the negative effects experienced by the partially filled memory locations (e.g., blocks). The memory management mechanism can be configured according to the organizational structure and the operational groupings utilized by the memory system 102. In some embodiments, the memory management mechanism can include a block management mechanism 150 configured to operate at the memory block level, such as by identifying the partially filled blocks/PB s, tracking open durations for the PB s, identifying and tracking ends of valid data within the PBs, and managing closing of such PBs. For example, the block management mechanism 150 can include and/or update a block tracking list 152 that lists open PB identifiers 154. For each open PB, the block management mechanism 150 can track (1) an open duration ($T_{OPEN}$) 156 or a duration that has elapsed since the corresponding PB has opened (via, e.g., one or more timers/counters) and/or (2) a last written WL (LWW) 158 that corresponds to the end of the valid data within the corresponding PB. The block management mechanism 150 can compare the open duration 156 and/or the amount of data (e.g., as represented by the LWW 158) within each PB to corresponding thresholds. Based on the comparison(s), the block management mechanism 150 can be configured to close the PB.

In closing the PB, the block management mechanism 150 can implement an internally sourced (e.g., without a corresponding command from the host 104) programming operation for one or more WLs subsequent to the LWW 158. In other words, the block management mechanism 150 can perform a dummy programming operation 160 using predetermined data to fill the one or more WLs after the valid data. In some embodiments, the LWW 158 can remain unchanged, thereby excluding the dummy programming content from the valid content stored in the closed PB. Additionally or alternatively, the memory system 102 can use the dummy programming content as a marker, similar to an end of file marker, that identifies the end of valid content within the PB. Moreover, the block management mechanism 150 can use the one or more WLs occupied by the dummy programming content to provide increased reliability for the valid content within the PB. Using the dummy programming operation, the block management mechanism 150 can direct or localize the increased charge loss to the additionally written WLs and away from the LWW 158. Accordingly, the block management mechanism 150 can use the block tracking list 152 and the dummy programming operation 160 to provide a variety of benefits, such as reducing the error rates for the PB s, reducing the rewrites or maintenance refreshes for the PB s, increasing the lifetime of PB s by reducing the rewrites, and more.

Block Stripe

Additionally, in controlling the operations of the memory system 102, the memory system controller 114 can leverage multiple packages/dies to store one unit or grouping of data (e.g., a large content of one or a set of related programming operations). Instead of storing the one unit/grouping of data sequentially within pages and blocks of a single die using a common programming circuit therein, the memory system 102 can sequentially store across pages/blocks of multiple dies and leverage separate programming circuits therein. Accordingly, the memory system 102 can control the separate circuits to temporally overlap or implement in parallel the program and/or read operations for the one unit of data. As a result of the overlapped/parallel operations, the memory system 102 can reduce or eliminate the overall operation time in programming and/or reading the one unit of data.

The memory system 102 can use a grouping and track the unit of data across the multiple dies/packages. FIG. 1B is a block diagram of an example block stripe (BS) 180 (e.g., a collection of memory blocks that are within different memory dies/packages) in accordance with an embodiment of the present technology. The memory system 102 can group memory blocks that are each in a different die to one BS 180 storing one unit of data, such as write data exceeding a page/block size, data written successively within threshold time from each other, and/or data otherwise linked or related to each other. The BS 180 can have a length 182 corresponding to a quantity of the dies included therein. In some embodiments, the memory system 102 can use a predetermined value for the BS length 182. In other embodiments, the memory system 102 can dynamically configure and track the BS length 182. In other words, the BS 180 can be independently configured according to real-time conditions associated with the data stored therein.

In leveraging the BS 180, the memory system 102 can open and maintain more memory blocks than sequentially writing into and filling one die before moving to the next die. The increase in the open memory blocks can increase the number of PB s. Without the memory management mechanism (e.g., the block management mechanism 150 of FIG. 1A), the increase in the number of open blocks (e.g., in comparison to storing into sequential blocks within one die) can increase the negative effects described above. As such, the memory system 102 can use the memory management mechanism along with the BS 180 to manage and close one or more of the memory blocks in the BS 180. Details regarding the memory management mechanism are described below.

Partially Written/Filled Block

FIG. 2 illustrates a partially filled block (PB) 200 in accordance with an embodiment of the present technology. In some embodiments, the memory system 102 of FIG. 1A can fill memory blocks 202 within a die according to a predetermined WL sequence, such as from the top (e.g., highest WL number) to the bottom. The memory system 102 can track the LWW 158 as the memory blocks 202 and the WLs therein become occupied with valid data.

Each of the memory blocks 202 can include memory pages that are identified by a number that also follows a predetermined page sequence (e.g., 0-maximum page capacity). Accordingly, when the memory blocks 202 are fully programmed (e.g., containing maximum amount of valid data), the tracked page number can correspond to a maximum threshold page number. Accordingly, for the illustrated embodiment, the PB 200 can correspond to (1) the tracked page number less than the maximum threshold page number.

Figure 1B:
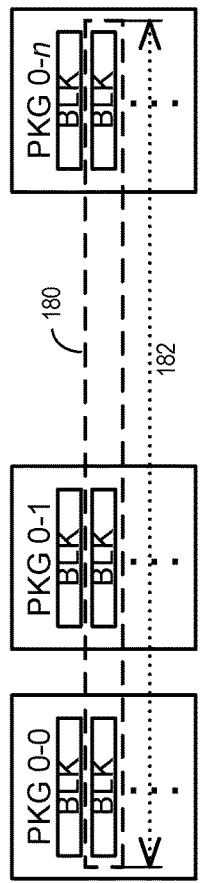
FIG. 1B is a block diagram of an example block stripe in accordance with an embodiment of the present technology.

Additionally or alternatively, the memory system 102 can use a minimum storage requirement 204 that is between the first writable WL and the last writable WL to trigger the dummy programming operation 160 of FIG. 1A. In some embodiments, the LWW 158 of the PB 200 may be resilient to charge loss or have similar resiliency as other written WLs when the total amount of stored data exceeds the minimum storage requirement 204. Accordingly, the memory system 102 can forego the dummy programming operation 160 and/or the forced block closing operation when the stored amount of data exceeds the minimum storage requirement 204. In other words, the memory system 102 can selectively trigger the dummy programming operation 160 and/or the forced block closing operation for the PB 202 having the open duration 156 of FIG. 1A exceeding the open duration threshold while storing less than the minimum storage requirement 204. For the illustrated embodiment, the minimum storage requirement 204 can correspond to a WL number N, and the memory system 102 can trigger the dummy programming operation 160 and/or the forced block closing when the LWW158 is greater than the threshold WL number.

Control Flow

Figure 3:
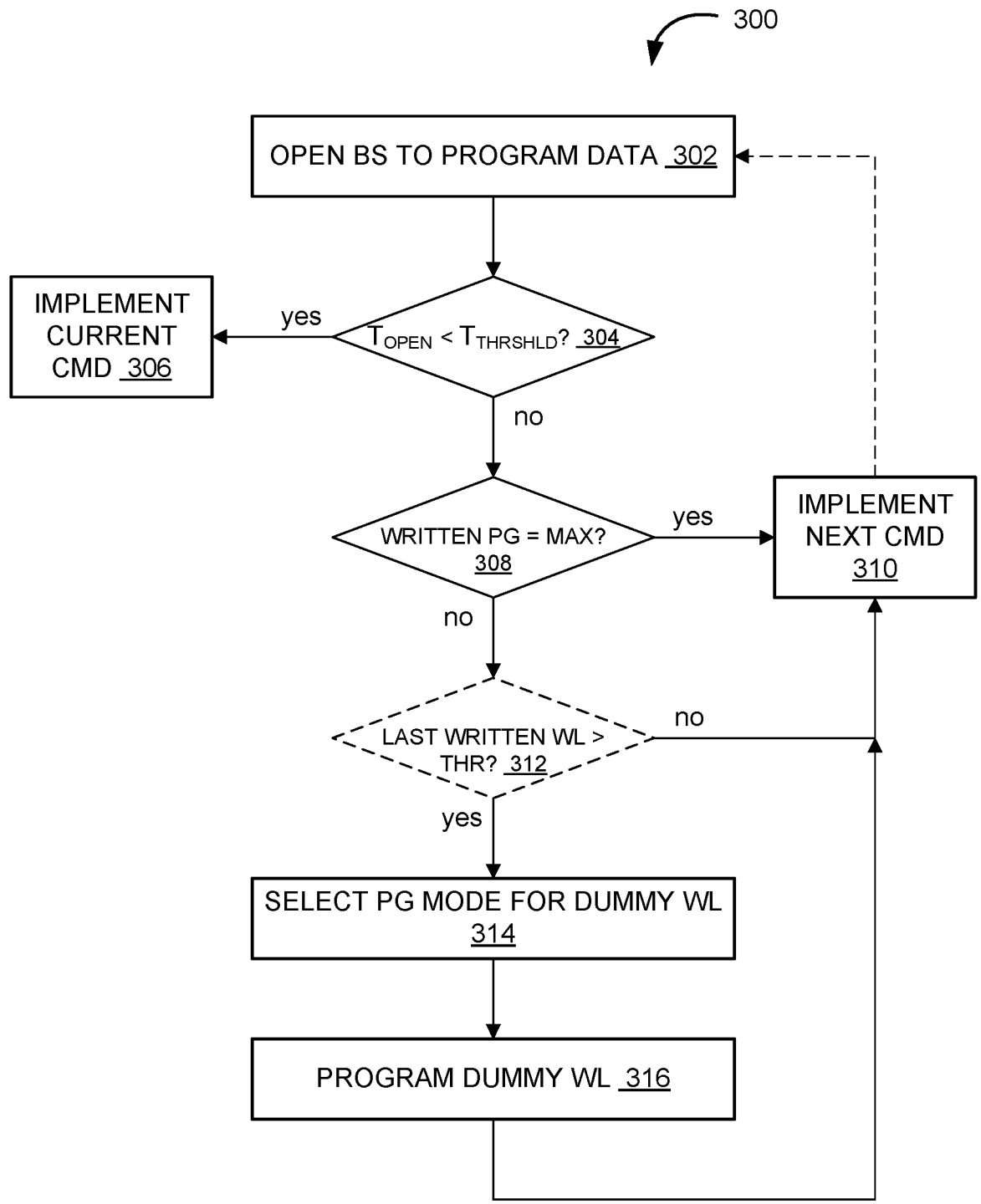
FIG. 3 is a flow diagram illustrating an example method of operating an apparatus in accordance with an embodiment of the present technology.

FIG. 3 is a flow diagram illustrating an example method 300 of operating an apparatus (e.g., the computing system 100, the memory system 102, and/or one or more components therein as illustrated in FIG. 1A) in accordance with an embodiment of the present technology. The method 300 can correspond to the operation of the memory management mechanism (e.g., the block management mechanism 150 of FIG. 1A). For example, the method 300 can illustrate the controls related to implementation of the dummy programming operation 160 of FIG. 1A and/or the forced closing of the PB 200 of FIG. 2.

At block 302, the apparatus can open a BS (e.g., the BS 180 of FIG. 1B) to program data received from the host 104 of FIG. 1A. Along with opening the BS 180 for programming operations, the memory system 102 can begin the timer/counter to track the open duration 156 of FIG. 1A.

While operating with the BS open, the apparatus can determine whether the BS has been open for the open duration threshold. For example, in implementing a command, the memory system 102 can compare the open duration 156 of the open BS 180 or the targeted die therein to the open duration threshold as illustrated in decision block 304. When the open duration 156 is less than the corresponding threshold, the memory system 102 can implement the current command as illustrated in block 306. Additionally or alternatively, the memory system 102 can periodically compare the open duration 156 to the corresponding threshold independent of any upcoming or received commands. Also, in some embodiments, the memory system 102 can reset the open duration 156 for the block after implementing a programming operation at the corresponding block. The open duration threshold may be a predetermined number of hours, such as between one hour and ten hours.

When the open duration 156 is not less (e.g., meets or exceeds) the open duration threshold, the memory system 102 can determine whether the targeted block is a PB. For example, the memory system 102 can determine whether the last-written page of the targeted block meet the page number corresponding to the maximum storage capacity as illustrated in decision block 308. When the memory system 102 determines that the targeted block is at maximum storage capacity, the memory system can implement the next command as illustrated at block 310. In implementing the next command, the memory system 102 can determine that the targeted block is full, close the memory block, move the pointer to the next die, and/or close the current BS and move the next BS.

When the target block is storing less than the maximum storage capacity (e.g., when the written page does not match the maximum page number), the memory system 102 can determine the targeted block as a PB. In some embodiments, the memory system 102 can further determine whether the amount of the stored valid data in the PB meets the minimum storage requirement 204 of FIG. 2 to trigger the dummy programming operation 160. For example, the memory system 102 can compare the LWW 158 to the WL identifier corresponding to the minimum storage requirement 204 as illustrated at a decision block 312. For such embodiments, the memory system 102 can implement the next command as illustrated at block 310 and/or close the memory block when the LWW 158 meets or exceeds the WL threshold. The memory system 102 can trigger the dummy programming operation 160 when the LWW 158 is less than the WL threshold. In other embodiments, the memory system 102 can implement the dummy programming operation 160 directly in response to determining that the targeted block is a PB (e.g., without the comparison for the minimum storage requirement 204 illustrated in decision block 312).

In implementing the dummy programming operation 160, the memory system 102 can select a page mode (e.g., SLC, MLC, TLC, QLC, etc.) for the WL (e.g., open/available WL physically adjacent to the LWW) targeted for the dummy programming operation 160. In some embodiments, the memory system 102 can be configured to select a predetermined page mode (e.g., SLC or MLC) for the dummy programming operation 160 as illustrated at block 314. In other embodiments, the memory system 102 can dynamically select the page mode according to real-time conditions, such as error rate, garbage collection metric (e.g., valid memory size per block), the actual amount of stored data (e.g., the identifier/number of the LWW 158), remaining available memory, state of command receiving queue, and/or the like. In selecting the page mode, the memory system 102 can balance the programming speed (fastest for the SLC) with other parameters, such as the loss rate for the denser mode and/or the measure of protection provided to the valid data.

At block 316, the memory system 102 can implement the dummy programming operation 160 to program the dummy WL (e.g., the next WL or the open WL physically adjacent to the LWW). The memory system 102 can program (via an internally generated command and without a corresponding command from the host 104) the open WL with predetermined data according to the selected page mode. After implementing the dummy programming operation 160, the memory system 102 can implement the next command as illustrated at block 310. In implementing the next command, the memory system 102 can further close the corresponding/current memory block/BS and/or access a new block/BS as described above.

Overall System

Figure 4:
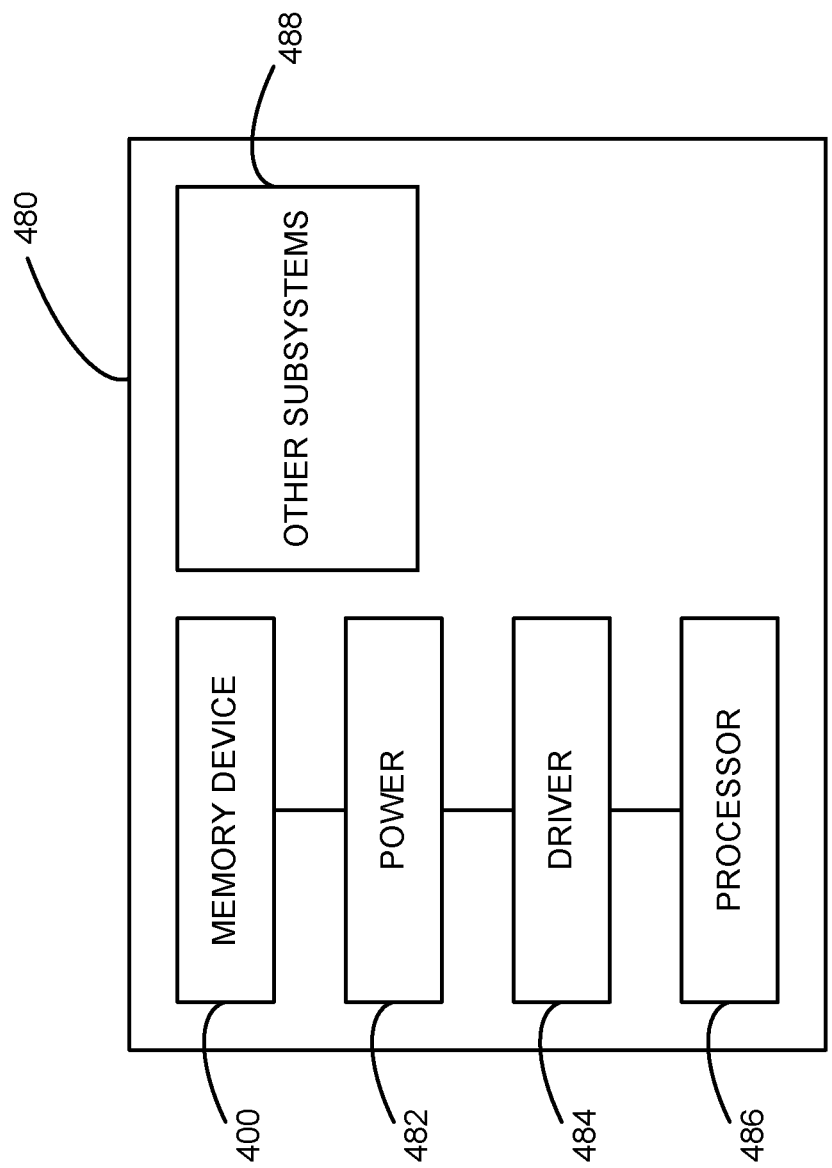
FIG. 4 is a schematic view of a system that includes an apparatus in accordance with an embodiment of the present technology.

FIG. 4 is a schematic view of a system that includes an apparatus in accordance with embodiments of the present technology. Any one of the foregoing apparatuses (e.g., memory devices) described above with reference to FIGS. 1A-3 can be incorporated into any of a myriad of larger and/or more complex systems, a representative example of which is system 480 shown schematically in FIG. 4. The system 480 can include a memory device 400, a power source 482, a driver 484, a processor 486, and/or other subsystems or components 488. The memory device 400 can include features generally similar to those of the apparatus described above with reference to one or more of the FIGS, and can therefore include various features for performing a direct read request from a host device. The resulting system 480 can perform any of a wide variety of functions, such as memory storage, data processing, and/or other suitable functions. Accordingly, representative systems 480 can include, without limitation, hand-held devices (e.g., mobile phones, tablets, digital readers, and digital audio players), computers, vehicles, appliances and other products. Components of the system 480 may be housed in a single unit or distributed over multiple, interconnected units (e.g., through a communications network). The components of the system 480 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of NAND Flash devices. Apparatuses configured in accordance with other embodiments of the present technology, however, can include other types of suitable storage media in addition to or in lieu of NAND Flash devices, such as, devices incorporating NOR-based non-volatile storage media (e.g., NAND flash), magnetic storage media, phase-change storage media, ferroelectric storage media, dynamic random access memory (DRAM) devices, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage, or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to one or more of the FIGS. described above.

I claim:

1. A memory device, comprising:
   a memory array including programmable memory cells that are grouped into memory blocks; and
   a memory controller operably coupled to the memory array and configured to:
      open a memory block for implementing a series of commanded programming operations;
      track an open duration for the memory block while the memory block remains open;
      determine that the open duration has met or exceeded a corresponding threshold; and
      in response to determining that the open duration has met or exceeded the corresponding threshold, implement an internally commanded programming operation to store dummy data at an available word line (WL) adjacent to a last written WL (LWW) storing data commanded for storage by a host device.

2. The memory device of claim 1, wherein the memory controller is configured to:
   determine an amount of data stored in the memory block;
   compare the amount of data to a threshold corresponding to a minimum storage requirement; and
   implement the internally commanded programming operation when the comparison indicates that the memory block includes the amount of data less than the minimum storage requirement.

3. The memory device of claim 2, wherein the memory controller is configured to:
   determine the LWW as a representation of the amount of data;
   implement the internally commanded programming operation when an identifier for the LWW is greater than a threshold WL number representative of the minimum storage requirement for the memory device configured to store data from a highest available WL number to a lowest available WL number.

4. The memory device of claim 1, wherein the memory controller is configured to:
   based on determining that the open duration has met or exceeded the corresponding threshold, determine that the memory block is a partially filled block (PB) with available storage space; and
   closing the PB from further programming operations after implementing the internally commanded programming operation.

5. The memory device of claim 4, wherein the memory controller is configured to:
   determine that the memory block is the PB based on comparing a last written page number to a threshold page number; and
   implement the internally commanded programming operation when the last written page number is less than the threshold available page number for the memory device configured to store data from a lowest available page number to the threshold page number.

6. The memory device of claim 1, wherein the memory controller is configured to implement the internally commanded programming operation according to a page type predetermined for the available WL adjacent to the LWW.

7. The memory device of claim 1, wherein the predetermined page type corresponds to configuring corresponding memory cells as (1) single level cells (SLCs) for storing one bit per memory cell or (2) multilevel cells (MLCs) for storing two bits per memory cell.

8. The memory device of claim 1, wherein the memory controller is configured to:
   dynamically select a page type for the internally commanded programming operation based on one or more real-time conditions including an error measure, a garbage collection measure, an amount of data stored in the memory block, available memory remaining in the memory array, a state of a command receiving queue, or a combination thereof; and
   implement the internally commanded programming operation according to the dynamically selected page type.

9. The memory device of claim 1, wherein:
   the memory array includes multiple dies that each have the memory blocks; and
   the memory controller is configured to open a block stripe (BS) that includes the memory block from a corresponding die along with at least one memory block from each remaining die in the multiple dies, wherein the block stripe is for operating circuits in the multiple dies in overlapping or simultaneous timing to store a set of related data, wherein opening the block stripe includes opening the memory block.

10. The memory device of claim 9, wherein the memory controller is configured to close the memory block and/or the BS from further programming operations after implementing the internally commanded programming operation.

11. A method of operating a memory device that includes programmable memory cells organized into memory blocks, the method comprising:
   opening a memory block for implementing a series of commanded programming operations;
   tracking an open duration for the memory block while the memory block remains open;
   determining that the open duration has met or exceeded a corresponding threshold; and
   in response to determining that the open duration has met or exceeded the corresponding threshold, implementing an internally commanded programming operation to store dummy data at an available word line (WL) adjacent to a last written WL (LWW) storing data commanded for storage by a host device.

12. The method of claim 11, further comprising:
   determining an amount of data stored in the memory block; and comparing the amount of data to a threshold corresponding to a minimum storage requirement, wherein the internally commanded programming operation is implemented when the comparison indicates that the memory block includes the amount of data less than the minimum storage requirement.

13. The method of claim 11, further comprising:
based on determining that the open duration has met or exceeded the corresponding threshold, determining that the memory block is a partially filled block (PB) with available storage space; and
closing the PB from further programming operations after implementing the internally commanded programming operation.

14. The method of claim 11, wherein:
the memory device includes multiple dies each with a set of memory blocks for storing data;
opening the memory block corresponds to opening a block stripe (BS) that includes the memory block from a corresponding die along with at least one memory block from remaining dies in the multiple dies, wherein the block stripe is for operating circuits in the multiple dies in overlapping or simultaneous timing to store a set of related data; and
further comprising:
closing the BS from further programming operations after implementing the internally commanded programming operation.

15. The method of claim 11, wherein the internally commanded programming operation is implemented according to a page type predetermined for the available WL adjacent to the LWW.

16. A non-volatile memory device, comprising:
a memory array including multiple dies each having rewritable memory cells that are organized into memory blocks configured to store data; and
a memory controller operably coupled to the memory array and configured to:
open a block stripe (BS) for storing a set of related data, wherein the BS includes at least one memory block from each die in the multiple dies;
track an open duration for the BS or a target memory block therein while the BS remains open;
determine that the open duration has met or exceeded a corresponding threshold;
in response to determining that the open duration has met or exceeded a corresponding threshold, implement an internally commanded programming operation at the target memory block to store dummy data at an available word line (WL) adjacent to a last written WL (LWW) storing data commanded for storage by a host device; and
close the target memory block and/or the BS after implementing the internally commanded programming operation to prevent further programming operations.

17. The non-volatile memory device of claim 16, wherein the memory controller is configured to:
determine an amount of data stored in the target memory block;
compare the amount of data to a threshold corresponding to a minimum storage requirement; and
implement the internally commanded programming operation when the comparison indicates that the target memory block includes the amount of data less than the minimum storage requirement.

18. The non-volatile memory device of claim 16, wherein the memory controller is configured to:
based on determining that the open duration has met or exceeded the corresponding threshold, determine that the target memory block is a partially filled block (PB) with available storage space; and
closing the PB from further programming operations after implementing the internally commanded programming operation.

19. The non-volatile memory device of claim 16, wherein the memory controller is configured to implement the internally commanded programming operation according to a page type predetermined for the available WL adjacent to the LWW.

20. The non-volatile memory device of claim 16, wherein the memory controller is configured to:
dynamically select a page type for the internally commanded programming operation based on one or more real-time conditions including an error measure, a garbage collection measure, an amount of data stored in the target memory block, available memory remaining in the memory array, a state of a command receiving queue, or a combination thereof; and
implement the internally commanded programming operation according to the dynamically selected page type.

* * * * *